(12) United States Patent
Gibson et al.

(10) Patent No.: US 10,972,583 B2
(45) Date of Patent: *Apr. 6, 2021

(54) METHODS AND SYSTEMS FOR PERSONALIZING USER EXPERIENCE BASED ON PERSONALITY TRAITS

(71) Applicant: Spotify AB, Stockholm (SE)

(72) Inventors: Clay Gibson, New York, NY (US); Will Shapiro, New York, NY (US); Santiago Gil, Portland, OR (US); Ian Anderson, New York, NY (US); Margreth Mpossi, Stamford, CT (US); Oguz Semerci, New York, NY (US); Scott Wolf, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,990

(22) Filed: Feb. 14, 2020

(65) Prior Publication Data

US 2020/0244768 A1 Jul. 30, 2020

Related U.S. Application Data

(63) Continuation of application No. 16/186,292, filed on Nov. 9, 2018, now Pat. No. 10,798,214, which is a (Continued)

(51) Int. Cl.
H04L 29/08 (2006.01)
(52) U.S. Cl.
CPC .......... H04L 67/327 (2013.01); H04L 67/142 (2013.01); H04L 67/22 (2013.01); H04L 67/306 (2013.01)
(58) Field of Classification Search
CPC ............................. H04L 67/327; H04L 67/142
See application file for complete search history.

(56) References Cited

U.S. PATENT DOCUMENTS 6,968,511 B1 * 11/2005 Robertson ............... G06F 3/048
715/205
8,706,841 B2 * 4/2014 Gordon ............ H04N 21/23617
709/218

(Continued)

FOREIGN PATENT DOCUMENTS

CN 105516152 A * 4/2016

OTHER PUBLICATIONS

Gibson, Notice of Allowance, U.S. Appl. No. 15/442,587, dated Jul. 7, 2017, 9 pgs.

(Continued)

*Primary Examiner* — Arvin Eskandarnia
(74) *Attorney, Agent, or Firm* — Morgan, Lewis & Bockius LLP

(57) ABSTRACT

An electronic device associated with a media-providing service assigns one or more characteristics of media items to at least one respective personality trait of a plurality of personality traits. The media items are provided by the media-providing service. The electronic device assigns one or more user behaviors to a first personality trait and tracks behavior of a user. The electronic device determines that a tracked behavior of the user corresponds to a first user behavior of the one or more user behaviors and assigns the first personality trait to the user based at least in part on determining that the tracked behavior of the user corresponds to the first user behavior. The electronic device provides personalized content to the user in accordance with a determination that the degree to which the tracked behavior of the user corresponds to the first user behavior satisfies a threshold.

19 Claims, 6 Drawing Sheets

Related U.S. Application Data continuation of application No. 15/948,211, filed on Apr. 9, 2018, now Pat. No. 10,148,789, which is a continuation of application No. 15/831,302, filed on Dec. 4, 2017, now Pat. No. 9,942,356, which is a continuation-in-part of application No. 15/682,391, filed on Aug. 21, 2017, now Pat. No. 10,334,073, which is a continuation of application No. 15/442,587, filed on Feb. 24, 2017, now Pat. No. 9,742,871.

(60) Provisional application No. 62/463,553, filed on Feb. 24, 2017.

(56) References Cited

U.S. PATENT DOCUMENTS

| | | | | |
|---|---|---|---|---|
| 8,856,331 | B2* | 10/2014 | Coyer | H04L 65/4076 709/226 |
| 2002/0078447 | A1* | 6/2002 | Mizutome | H04N 5/4401 725/37 |
| 2008/0104058 | A1* | 5/2008 | Billmaier | H04N 21/4314 |
| 2010/0010986 | A1* | 1/2010 | Icho | G06F 17/30058 707/E17.014 |
| 2010/0076815 | A1* | 3/2010 | Jain | G06Q 30/02 705/7.29 |
| 2010/0287588 | A1* | 11/2010 | Cox | H04N 5/44543 725/40 |
| 2012/0142429 | A1* | 6/2012 | Muller | A63F 13/35 463/42 |
| 2012/0254388 | A1* | 10/2012 | Duxbury | H04L 43/026 709/223 |
| 2014/0189525 | A1 | 7/2014 | Trevisiol et al. | |
| 2014/0237114 | A1* | 8/2014 | Lin | H04L 41/042 709/224 |
| 2014/0297740 | A1* | 10/2014 | Narayanan | G06Q 10/10 709/204 |
| 2014/0359439 | A1* | 12/2014 | Lyren | G06F 16/951 715/705 |
| 2015/0019343 | A1* | 1/2015 | Carroll | G06Q 50/20 705/14.66 |
| 2015/0088878 | A1* | 3/2015 | Bilinski | G06F 17/30058 707/736 |
| 2015/0206441 | A1* | 7/2015 | Brown | G09B 5/00 434/308 |
| 2015/0206442 | A1* | 7/2015 | Brown | G06Q 30/0621 434/362 |
| 2015/0242707 | A1* | 8/2015 | Wilf | G06K 9/6256 382/159 |
| 2015/0301795 | A1* | 10/2015 | Lebrun | G06F 17/279 704/9 |
| 2016/0057499 | A1* | 2/2016 | Foerster | H04N 21/4758 705/319 |
| 2016/0063376 | A1* | 3/2016 | Chen | G06N 5/022 706/46 |
| 2016/0253681 | A1* | 9/2016 | de Souza | G06Q 30/0201 705/13 |
| 2017/0031920 | A1 | 2/2017 | Manning et al. | |
| 2017/0124074 | A1 | 5/2017 | Cama et al. | |

OTHER PUBLICATIONS

Gibson, Notice of Allowance, U.S. Appl. No. 15/831,302, dated Feb. 21, 2018, 12 pgs.

Gibson, Office Action dated Sep. 28, 2018, U.S. Appl. No. 15/682,391, 6 pgs.

Gibson, Notice of Allowance dated Feb. 12, 2019, U.S. Appl. No. 15/682,391, 10 pgs.

Gibson, Notice of Allowance, U.S. Appl. No. 15/948,211, dated Jul. 27, 2018, 8 pgs.

Gibson, Office Action dated Aug. 20, 2019, U.S. Appl. No. 16/186,292, 6 pgs.

Gibson, Notice of Allowance dated Mar. 10, 2020, U.S. Appl. No. 16/186,292, 8 pgs.

Spotify AB, Extended European Search Report, EP18158182.8, dated Jun. 6, 2018, 8 pgs.

* cited by examiner

METHODS AND SYSTEMS FOR PERSONALIZING USER EXPERIENCE BASED ON PERSONALITY TRAITS

RELATED APPLICATIONS

This application is a continuation of Ser. No. 16/186,292, filed Nov. 9, 2018, entitled "Methods and Systems for Personalizing User Experience Based on Personality Traits," which is a continuation of Ser. No. 15/948,211, filed Apr. 9, 2018 (now U.S. Pat. No. 10,148,789), entitled "Methods and Systems for Personalizing User Experience Based on Personality Traits," which is a continuation of Ser. No. 15/831,302, filed Dec. 4, 2017 (now U.S. Pat. No. 9,942,356), entitled "Methods and Systems for Personalizing User Experience Based on Personality Traits," which is a continuation-in-part of Ser. No. 15/682,391, filed Aug. 21, 2017 (now Ser. No. 10,334,073), entitled "Methods and Systems for Session Clustering Based on User Experience, Behavior, and Interactions," which is a continuation of Ser. No. 15/442,587, filed Feb. 24, 2017 (now U.S. Pat. No. 9,742,871), entitled "Methods and Systems for Session Clustering Based on User Experience, Behavior, and Interactions"; Ser. No. 15/831,302 also claims priority to U.S. Provisional Application No. 62/463,553, filed Feb. 24, 2017, entitled "Personalizing Content Streaming Based on User Behavior." All of these applications are incorporated by reference in their entirety.

TECHNICAL FIELD

The disclosed implementations relate generally to personalizing the user experience for media streaming, and, in particular, to personalizing content in accordance with one or more personality traits that are assigned to the user based on content consumed by the user, user behavior, and/or user demographics.

BACKGROUND

Access to electronic media, such as music and video content, has expanded dramatically over time. As a departure from physical media, media content providers (i.e., media-providing services) stream media to electronic devices (e.g., across wireless networks), improving the convenience with which users can consume and experience such content. As part of the service they provide and to assist users in having a positive user experience, media content providers track and process user data in an attempt to understand user preferences, and ultimately to provide relevant content personalization.

SUMMARY

Accordingly, there is a need for systems and methods for personalizing media content in accordance with one or more personality traits associated with a user. The one or more personality traits may be a good indication of the user's preferences for different types of media content. Determining the one or more personality traits for a user and applying the results to personalize content gives media-providing services a sophisticated tool for improving user experience.

In accordance with some implementations, a method is performed at an electronic device associated with a media-providing service. The electronic device has one or more processors and memory storing instructions for execution by the one or more processors. The method comprises, at the electronic device, accessing a listening history of a user of the media-providing service. The method also comprises, based at least in part on the listening history of the user, assigning a first personality trait of a plurality of personality traits to the user. The method further comprises providing personalized content to the user based on the first personality trait.

In accordance with some implementations, an electronic device (e.g., a server system) includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the electronic device, cause the electronic device to perform the operations of the method described above.

Thus, effective methods are provided for personalizing content for users of a media-providing service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first personality trait could be termed a second personality trait, and, similarly, a second personality trait could be termed a first personality trait, without departing from the scope of the various described implementations. The first personality trait and the second personality trait are both personality traits, but they are not the same personality trait.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
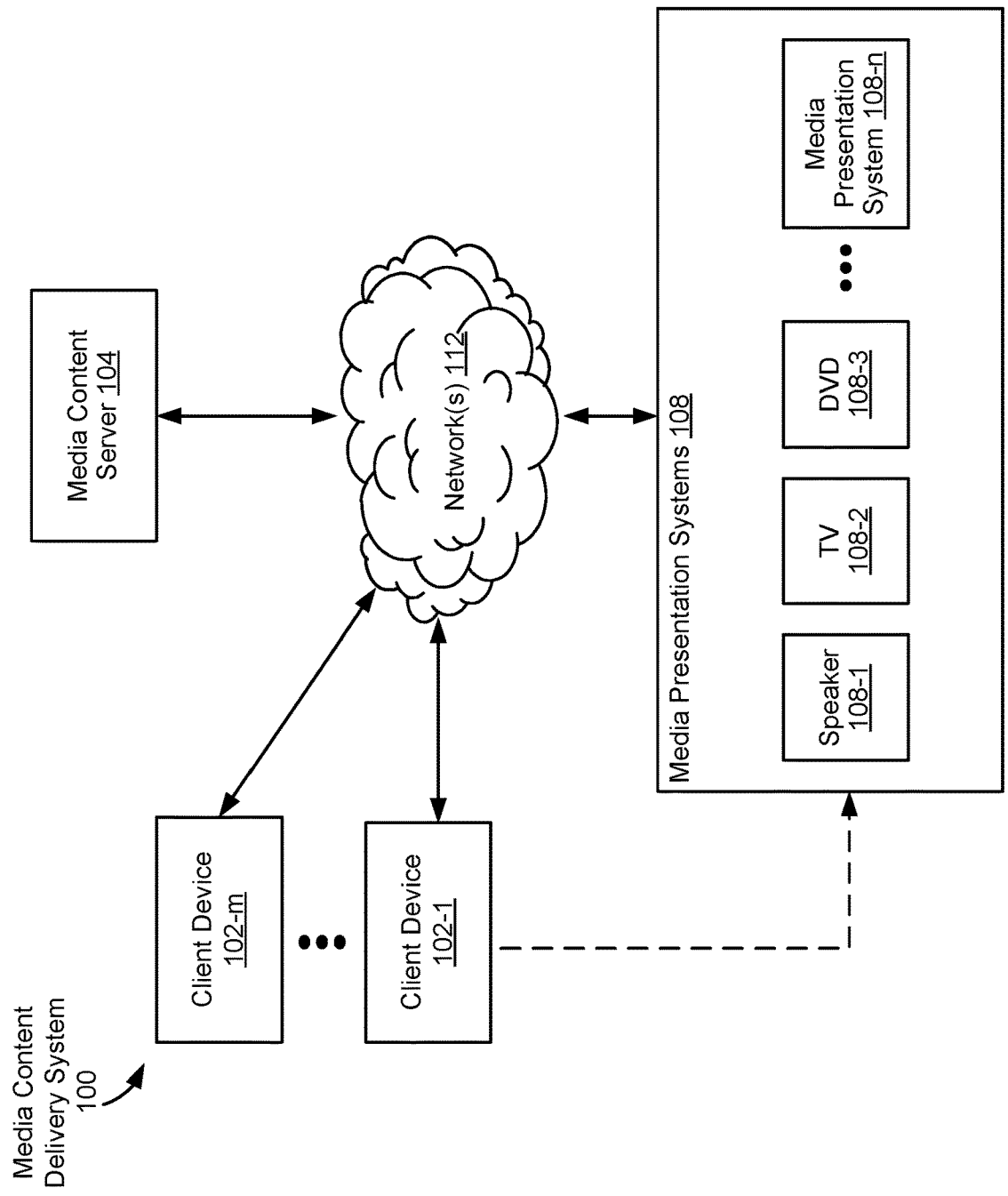
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-m is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as audio tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-m are the same type of device (e.g., client device 102-1 and client device 102-m are both mobile devices). Alternatively, client device 102-1 and client device 102-m are different types of devices.

In some implementations, client devices 102-1 and 102-m send and receive media-control information through the networks 112. For example, client devices 102-1 and 102-m send media control requests (e.g., requests to play audio, movies, videos, or other media items, or playlists thereof) to media content server 104 through network(s) 112. Additionally, client devices 102-1 and 102-m, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-m each include a media application 322 (FIG. 3) that allows a user of the client device to browse, request (e.g., for playback at the client device 102 and/or a media presentation system 108), and/or present media content (e.g., control playback of audio, videos, etc.). Media content may be stored locally (e.g., in memory 312 of the client device 102, FIG. 3) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 322 of client device 102-1 and/or 102-m) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks.

The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Personality traits of a user may relate to the user's music listening habits (e.g., as indicated by data stored in the listening history of the user). A variety of mood, genre, demographic and behavioral variables can correspond to different personality traits of a user. Thus, it is possible to identify a personality trait of a user based on the content (e.g., music) the user consumes (e.g., listens to) and the context in which they consume the content. For example, music that is energetic and rhythmic tends to be preferred by users who are extroverted. Users who are more open to new experiences tend to prefer music that is reflective and complex. In addition to the genres of the music, personality traits may also be related to a user's preferences for broad musical styles and fine-grained sonic features (e.g., beats per minute) and emotional musical attributes. An accumulation of listening behavior (e.g., the listening history), including content choices and patterns of interaction with the media-providing service, may be used to define musical taste.

Before assigning a personality trait to the user, a personality model may be built to relate information about a user and the user's listening patterns to personality traits. The personality model may be based on a variety of data sources related to users' demography (e.g., age, gender), musical taste, and interactions with the media-providing service (e.g., with an application on the client device 102). These data sources may be measured over a period of time (e.g., months). The model may also include a user's musical taste, which may be based on data from the users' listening history, represented for example as genre and mood vectors. The vectors are then aggregated and normalized to get a percentage of listening from each genre or mood. Other metrics may be incorporated into the model, including diversity metrics, discovery metrics, regularity and listening habits, and tilt. Discovery details how open a user is to exploring new music. Examples of discovery metrics are described in U.S. patent application Ser. No. 15/696,964, which is incorporated by reference in its entirety. Diversity focuses on the size of a user's musical universe, where users with low diversity have very narrow tastes. Examples of diversity metrics are described in U.S. patent application Ser. No. 15/729,351, which is incorporated by reference in its entirety. Contextual listening will indicate what a user's typical audio fingerprint is and whether the user's taste noticeably changes by context, thus providing information about regularity and listening habits. Examples of regularity metrics are described in U.S. patent application Ser. No. 15/684,841, which is incorporated by reference in its entirety. Tilt covers how a user engages with the media-providing service (e.g., application), such as whether the user actively chooses music or simply lets music play in the background. Tilt thus measures a user's tendency to engage with the media-providing service through a client device.

The model may identify users' personality traits based on a questionnaire, such as the Big Five Inventory (BFI-44) or the Meyers-Briggs personality survey. The traits measured by the questionnaire may then be used as the possible personality traits that can be assigned to the user. For example, where the Big Five Inventory is used to create the model, the possible personality traits to assign to the user include the Big Five personality traits: openness, conscientiousness, extraversion, agreeableness, and neuroticism.

A regression model (e.g., a Lasso regression model) using the same set of metrics is used to predict the numerical values of each of the personality traits. In some embodiments, a plurality of regression models are used to predict personality traits. For each model, cross-validation (e.g., a 10-fold cross-validation) may be used to test the out-of-sample accuracy of the model. This may indicate which of the personality traits are most predictable based on the data. For example, neuroticism and conscientiousness may be the most predictable. Further, each personality trait may be characterized by the presence of a specific variable. For example, neuroticism and openness may be characterized by the presence of a specific mood (e.g., an emotional tag associated with content).

In addition to correlating with mood (emotional tags), the personality traits may also have correlations with other metrics (e.g., diversity metrics, discovery metrics). For example, conscientiousness may correlate to maintaining a steady level of diversity across all time scales. The model may also be based on deep learning or trained on demographic segments. Other inputs, such as longer listening windows or additional metrics, may also be added to the model.

Figure 2A:
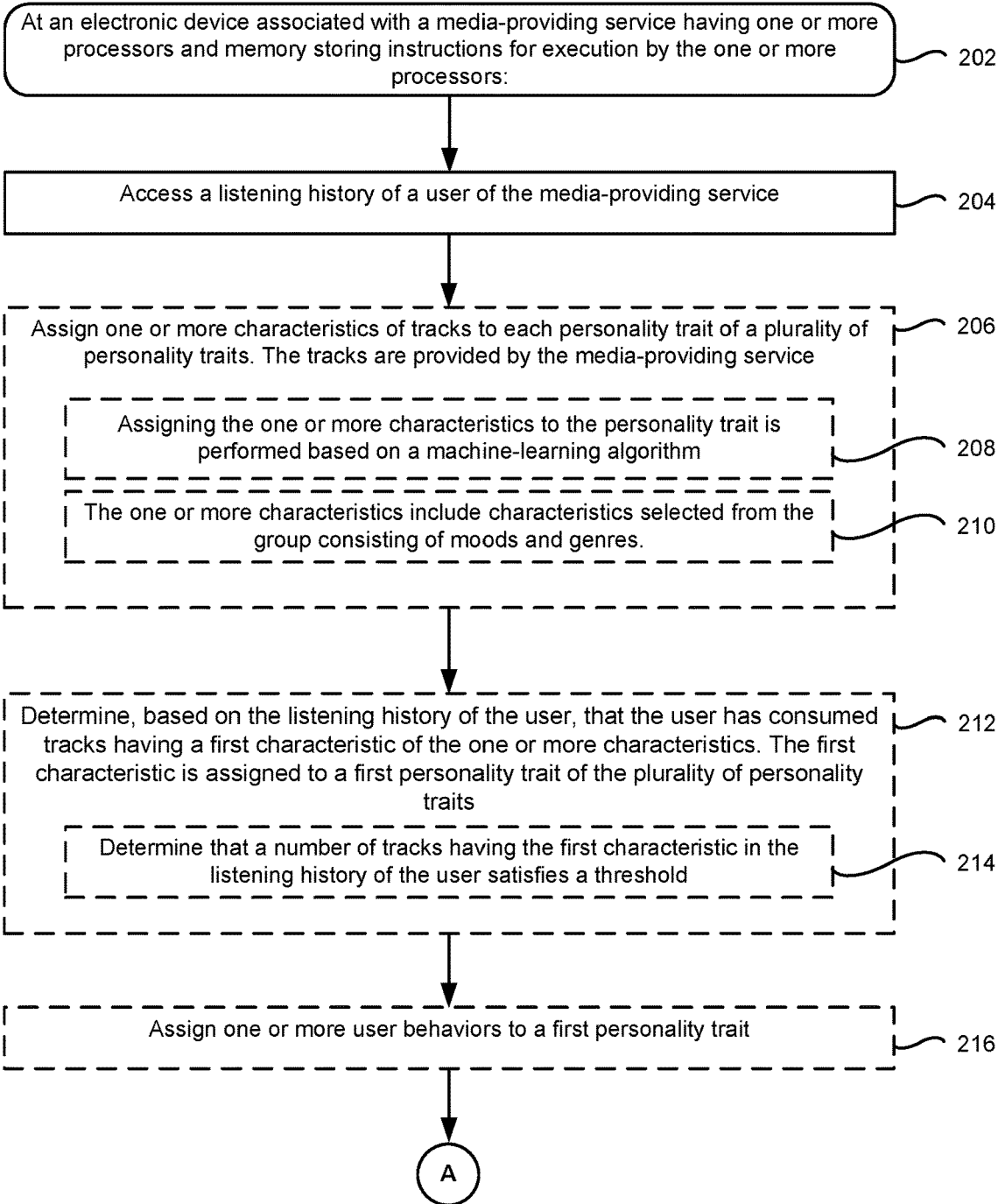
FIGS. 2A-2C are flow diagrams illustrating methods for providing personalized content in accordance with some implementations.
Figure 2B:
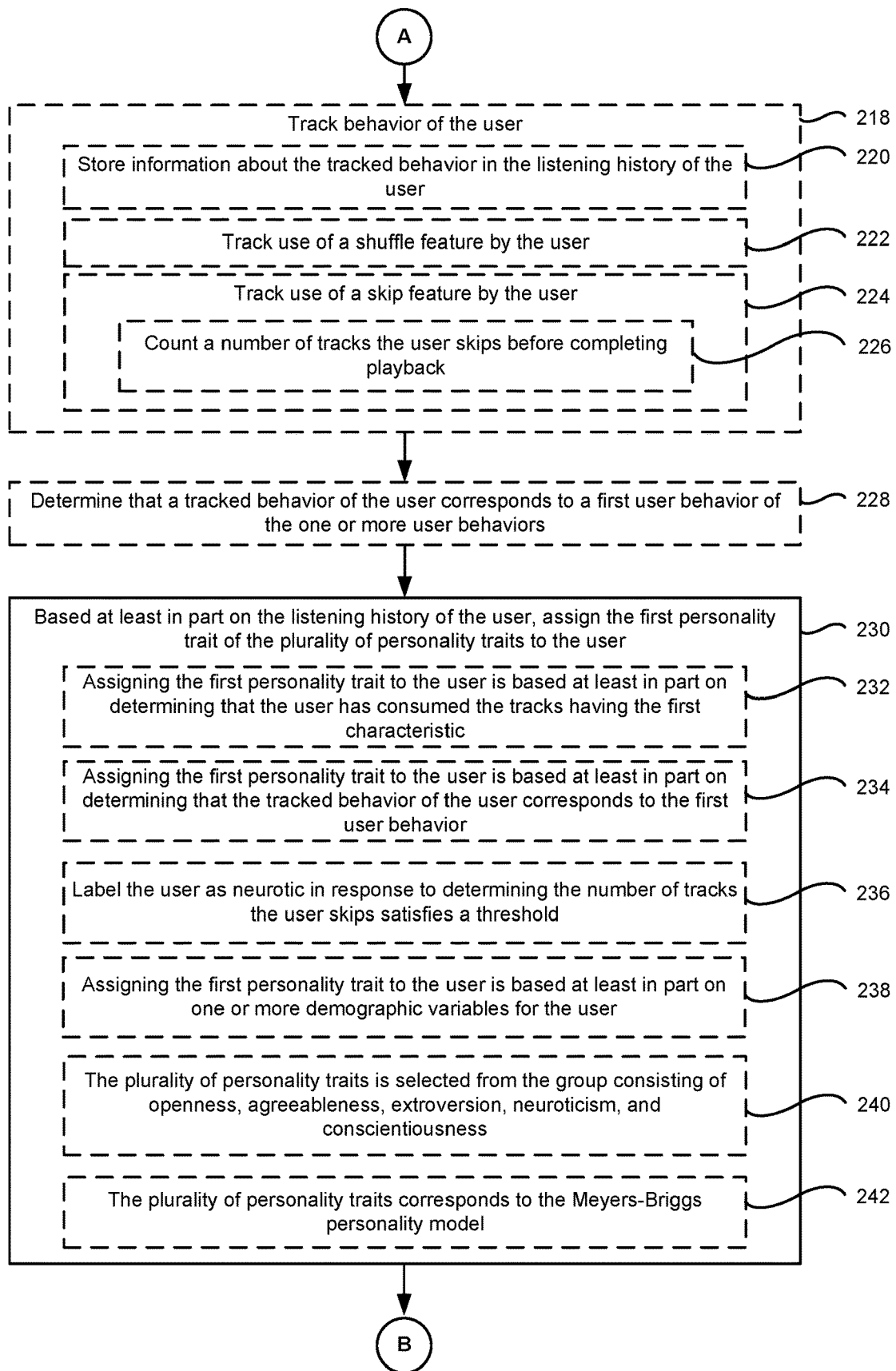
Figure 2C:
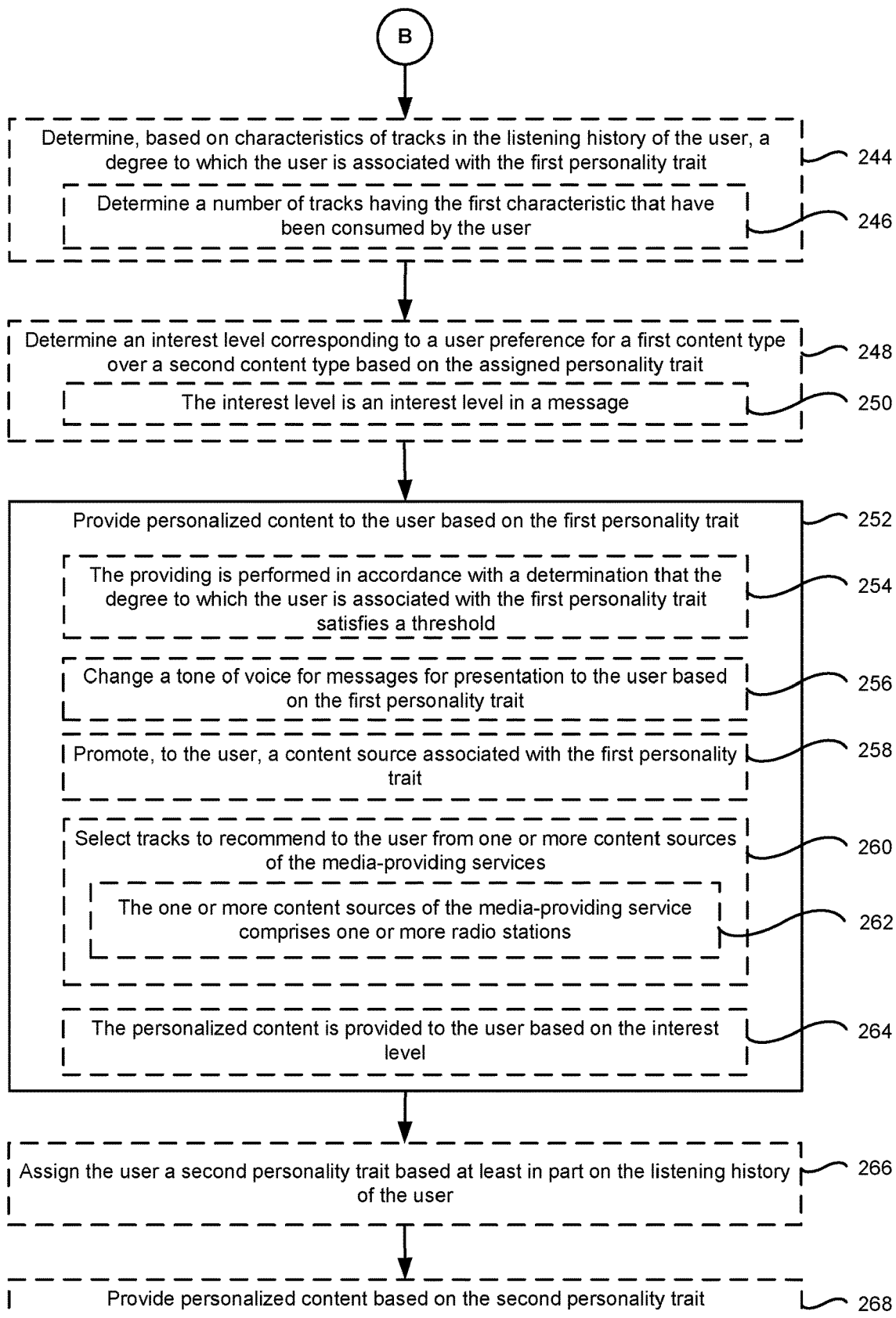

FIGS. 2A-2C are flow diagrams illustrating a method 200 for providing personalized content for a client device associated with a user, in accordance with some implementations. Method 200 may be performed (202) at an electronic device (e.g., media content server 104 and/or client device 102) having one or more processors and memory storing instructions for execution by the one or more processors. The electronic device is associated with a media-providing service. For example, the media content server provides media content for playback to client devices 102 and/or media presentation systems 108 in a media content delivery system 100, while the client device 102 allows the user to control playback. In some implementations, the method 200 is performed by executing instructions stored in the memory of the electronic device (e.g., in memory 406, FIG. 4 or memory 312, FIG. 3). In some implementations, the method 200 is performed by a plurality of electronic devices, for example by a combination of a server system and a client device.

Referring now to FIG. 2A, in performing the method 200, the electronic device accesses (204) a listening history of a user of the media-providing service. In some embodiments, the listening history specifies tracks consumed by (e.g., requested by, listened to by, streamed to, provided to) the user. The electronic device may compile the listening history by recording which tracks have been consumed by the user. In some embodiments, the listening history of the user includes a plurality of sessions with the media-providing service for the user. The listening history may contain additional information (e.g., artist, album, genre, etc.) about the tracks consumed by the user and/or about listening contexts in which the tracks were consumed (e.g., time of day, day of a week, location (e.g., in the car, at home), etc.). In some embodiments, the listening history is stored at an electronic device (e.g., a server and/or client device) distinct from (e.g., remote from) the electronic device performing the method 200. For example, the client device 102 may perform the method 200 and the listening histories 438 are stored at media content server 104. Alternately, the listening history is stored at the electronic device performing the method 200 (e.g., as the listening history 329 of client device 102 and/or the listening histories 438 of media content server 104).

In some embodiments, the electronic device assigns (206) one or more characteristics of tracks to each personality trait of a plurality of personality traits. The tracks are provided by the media-providing service. In some embodiments, assigning the one or more characteristics to the personality trait is performed (208) based on a machine-learning algorithm. In some embodiments, the machine-learning algorithm is based on a model, such as the model described above based on a data set from survey results (e.g., a survey in which users identify themselves as associated with one or more personality traits). In some embodiments, the one or more characteristics include (210) characteristics selected from the group consisting of moods (e.g., emotional tags associated with tracks) and genres, or from the group consisting of moods, genres, musical styles, and fine-grained sonic features. For example, a track may be tagged with one or more moods, such as excited, melancholic, dark, aggressive, etc. A track may also, or instead, be associated with one or more genres, such as rock, rap, country, religious, pop, alternative, jazz, classical, etc.

In some embodiments, the electronic device determines (212), based on the listening history of the user, that the user has consumed tracks having a first characteristic of the one or more characteristics. The first characteristic is assigned to a first personality trait of the plurality of personality traits. In some embodiments, an electronic device (e.g., the electronic device performing the method 200 or a distinct electronic device not performing the method 200) stores information that assigns and/or associates the tracks with the one or more characteristics. For example, an electronic device may assign one or more moods (emotional tags) and/or one or more genres to the tracks. In some embodiments, an electronic device may assign one or more musical styles and/or one or more fine-grained sonic features (e.g., beats per minute) to the tracks. In some embodiments, once the tracks are assigned to the one or more moods and/or the one or more genres, the assignment (i.e., the association between the tracks and moods/genres) is stored in the listening history of the user.

In some embodiments, the electronic device determines (214) that a number of tracks having the first characteristic in the listening history of the user satisfies a threshold. In some embodiments, the threshold can be a set number unrelated to the total number of tracks in the listening history. For example, the threshold may be K tracks, where K is an integer greater than one. In some embodiments, the threshold is a proportion (e.g., a fraction or percentage), such that the number of tracks having the first characteristic is dependent on how many tracks are in the listening history of the user. For example, the threshold may be J tracks, where J is a fraction or percentage of the total number of tracks. In some embodiments, in accordance with a determination that the number of tracks having the first characteristic in the listening history of the user does not satisfy the threshold, the electronic device forgoes assigning the first personality trait (associated with the first characteristic) to the user.

In some embodiments, the electronic device assigns (216) one or more user behaviors to a first personality trait. The one or more user behaviors may include information on how the user consumes content. For example, the electronic device may determine that a threshold use of a skip feature is assigned to neuroticism. As another example, the electronic device may associate a threshold use of a shuffle feature is assigned to openness.

Referring to FIG. 2B, in some embodiments, the electronic device tracks (218) behavior of a user. For example, the electronic device tracks listening behavior of the user, such as user inputs to control playback or user selection of tracks. In some embodiments, the electronic device stores (220) information about the tracked behavior in the listening history of the user. In some embodiments, the electronic device tracks a level of engagement the user has with the media-providing service (e.g., determines tilt metric). In some embodiments, the electronic device tracks a level of discovery of the user (e.g., determines a discovery metric). In some embodiments, the electronic device tracks (222) use of a shuffle feature by the user. In some embodiments, the electronic device tracks (224) use of a skip feature by the user. In some embodiments, the electronic device counts (226) a number of tracks the user skips before completing playback (e.g., a number of tracks that the user skips either completely or after partial playback).

In some embodiments, the electronic device determines (228) that a tracked behavior of the user (e.g., use of the shuffle feature tracked in step 222 or use of the skip feature tracked in step 224) corresponds to a first user behavior of the one or more user behaviors assigned to the first personality trait in step 216.

Based at least in part on the listening history of the user, the electronic device assigns (230) the first personality trait of the plurality of personality traits to the user. In some embodiments, assigning the first personality trait to the user is based at least in part on determining (232) that the user has consumed the tracks having the first characteristic (e.g., that the threshold in step 214 is satisfied). In some embodiments, assigning the first personality trait to the user is based at least in part on determining (234) that the tracked behavior of the user corresponds to the first user behavior. For example, the electronic device labels (236) the user as neurotic (or as having another personality trait) in response to determining the number of tracks the user skips satisfies a threshold, such that the user frequently skips tracks.

In some embodiments, assigning the first personality trait to the user (238) is based at least in part on one or more demographic variables for the user. The demographic variables may include age, gender, location, type of client device associated with the user, etc. The first personality trait may be associated with one or more demographic variables that have a positive or negative correlation based on the model. For example, an age of the user may be positively correlated with the personality trait of conscientiousness. In another example, use of a particular type of client device may be associated with extroversion or introversion. In some embodiments, assigning the first personality trait to the user is based on a number of tracks having the first characteristic satisfying a threshold, the detection of user behavior associated with the first personality trait, and/or demographic variables of the user being associated with the first personality trait. In some embodiments, these factors are weighted and used to assign the first personality trait to the user.

In some embodiments, the plurality of personality traits is selected (240) from the group consisting of openness, agreeableness, extroversion, neuroticism, and conscientiousness (i.e., traits from the Big Five personality model). In some embodiments, the plurality of personality traits corresponds (242) to the Meyers-Briggs personality model. The plurality of personality traits may correspond to other personality models. The plurality of personality traits may be selected from a combination of multiple personality models. For example, the personality traits may include some (or all) of the personality traits from the Big Five model and some (or all) of the personality traits from the Meyers-Briggs personality model.

Referring to FIG. 2C, in some embodiments, the electronic device determines (244), based on characteristics of tracks in the listening history of the user, a degree to which the user is associated with the first personality trait. In some embodiments, the electronic device determines (246) a number of tracks having the first characteristic that have been consumed by the user. For example, the degree to which the user is associated with the first personality trait may be based on (e.g., proportional to) the number (or proportion) of tracks having the first characteristic in the user's listening history.

In some embodiments, the electronic device determines (248) an interest level corresponding to a user preference for a first content type over a second content type based on the assigned personality trait. In some embodiments, the interest level is (250) an interest level in a message (e.g., an advertisement, a tooltip, a notification, a recommendation, etc.).

The electronic device provides (252) personalized content to the user based on the first personality trait. In some embodiments, the providing is performed (254) in accordance with a determination that the degree to which the user is associated with the first personality trait satisfies a threshold. For example, the electronic device may provide the personalized content in accordance with a determination that the user is neurotic enough (e.g., a degree of neuroticism for the user satisfies the threshold). In some embodiments, if the degree to which the user is associated with the first personality trait does not satisfy the threshold, the electronic device forgoes providing personalized content to the user.

In some embodiments, the threshold is predetermined by the electronic device. In some embodiments, the threshold of the degree to which the user is associated with the first personality is distinct from (i.e., has a different value than) the threshold of a degree to which the user is associated with a second personality trait. For example, the threshold to provide content to the user based on the user being associated with neuroticism may be a different threshold (e.g., greater than or less than) than the threshold to provide content to the user based on the user being associated with openness.

In some embodiments in which the personalized content includes one or more messages with audio components, the electronic device changes (256) a tone of voice for messages for presentation to the user based on the first personality trait. For example, the tone of voice may be more upbeat, high-pitched and/or exciting for users that have been assigned the personality trait of extroversion. The tone of voice may be quiet and/or soft-toned for users that have been assigned the personality trait of introversion. This modulation of tone helps to humanize the user interface for the media-providing service in accordance with the user's personality, thereby improving the user experience.

In some embodiments, the electronic device promotes (258), to the user, a content source associated with the first personality trait. For example, the content source could be a radio station and/or a playlist compiled (e.g., provided) by the media-providing service. The media-providing service may determine what content to include in the content source (e.g., select which tracks of the tracks available from the media-providing service will be provided by the content source). In some embodiments, the media-providing service determines what content to include in the content source based on the one or more personality traits assigned to the user. For example, the media-providing service may select tracks that are associated with a mood (e.g., have an emotional tag) for a particular personality trait (e.g., for neurotic users) and may compile the selected tracks into a playlist to be promoted to those users. The playlist thus may be promoted to the user of the method 200 in accordance with a determination that the user has the particular personality trait (e.g., is neurotic), In some embodiments, the electronic device selects (260) tracks to recommend and/or provide to the user from one or more content sources of the media-providing services based on the first personality trait. In some embodiments, the one or more content sources of the media-providing service comprises (262) one or more radio stations. In some embodiments, the electronic device selects tracks that are associated with a particular genre and/or mood based on the user having a personality trait that is associated with that particular genre and/or mood. For example, a user that is assigned to extraversion may be provided tracks that are associated with an upbeat mood.

In some embodiments, the personalized content is provided (264) to the user based on the interest level determined (248) to correspond to a user preference for a first content type over a second content type based on the assigned personality trait. For example, a user assigned to the personality trait of openness may have a preference for new content (content not previously consumed by the user) over old content (content that has been previously consumed by the user).

In some embodiments, the electronic device assigns (266) the user a second personality trait based at least in part on the listening history of the user. For example, a user may be assigned to two or more personality traits, such as both neurotic and introverted.

In some embodiments, the electronic device provides (268) personalized content based on the second personality trait. In some embodiments, the personalized content is the same content as the personalized content provided in any of steps 252-264. In some embodiments, the personalized content provided to the user based on the second personality trait is different content than any of the content provided as described above in any of steps 252-264. In some embodiments, the electronic device provides personalized content based on both the first personality trait and the second personality trait. For example, the electronic device may provide content that is associated with both the first personality trait and the second personality trait (e.g., a track that is associated with both the first and second personality traits). The electronic device may provide a variety of content to the user, where a portion of the provided content is associated with the first personality trait but not the second personality trait, a portion of the provided content is associated with the second personality trait but not the first personality trait, and/or a portion of the provided content is associated with both the first personality trait and the second personality trait.

Although FIGS. 2A-2C illustrate a number of logical stages in a particular order, stages which are not order dependent may be reordered and other stages may be combined or broken out. For example, any or all of steps 206 through 210 and 216 through 228 may be performed before step 204. Further, a plurality of electronic devices (e.g., a server system and/or a client device) may perform the different stages. A first electronic device (e.g., a client device) may provide a selected message to the user, while the listening history is stored at a second electronic device (e.g., a server system), and the personality trait may be assigned to the user by the first or the second electronic device.

While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

Figure 3:
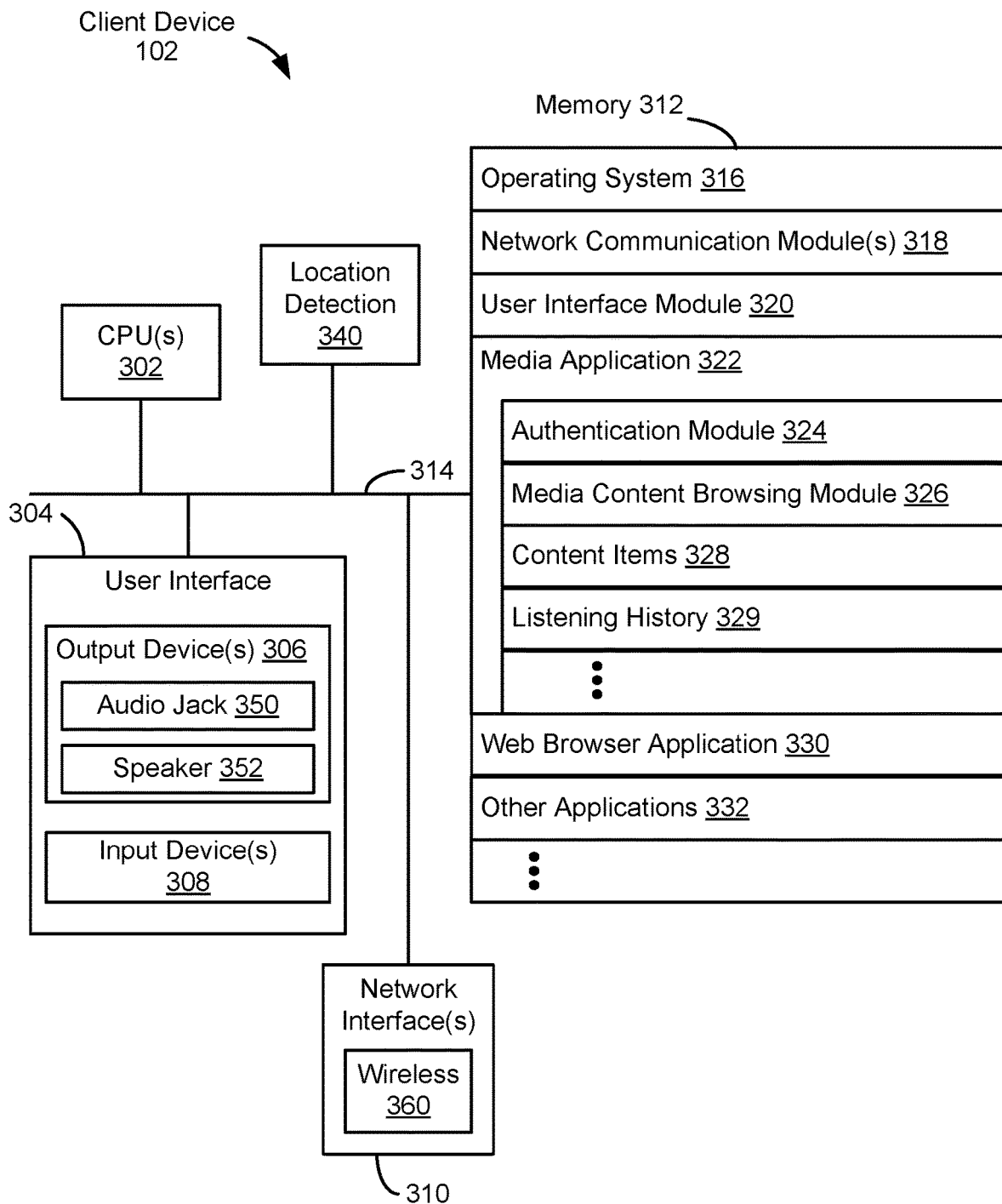
FIG. 3 is a block diagram illustrating a client device in accordance with some implementations.

FIG. 3 is a block diagram illustrating a client device 102 (e.g., client device 102-1 and/or client device 102-m, FIG. 1) in accordance with some implementations. The client device 102 includes one or more central processing units (CPU(s), i.e., processors or cores) 302, one or more network (or other communications) interfaces 310, memory 312, and one or more communication buses 314 for interconnecting these components.

The client device 102 includes a user interface 304, including output device(s) 306 and input device(s) 308. In some implementations, the input devices 308 include a keyboard, mouse, or track pad. Alternatively, or in addition, in some implementations, the user interface 304 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 306) include a speaker 352 (e.g., speakerphone device) and/or an audio jack 350 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 340, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 310 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 310 include a wireless interface 360 for enabling wireless data communications with other client devices 102, media presentations systems 108, and/or other wireless (e.g., Bluetooth-compatible) devices (e.g., for streaming audio data to the media presentations system 108). Furthermore, in some implementations, the wireless interface 360 (or a different communications interface of the one or more network interfaces 310) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 312 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 312 may optionally include one or more storage devices remotely located from the CPU(s) 302. Memory 312, or alternately, the non-volatile memory within memory 312, includes a non-transitory computer-readable storage medium. In some implementations, memory 312 or the non-transitory computer-readable storage medium of memory 312 stores the following programs, modules, and data structures, or a subset or superset thereof:

- an operating system 316 that includes procedures for handling various basic system services and for performing hardware-dependent tasks;
- network communication module(s) 318 for connecting the client device 102 to other computing devices (e.g., media presentation systems 108, media content server 104, and/or other client devices) via the one or more network interface(s) 310 (wired or wireless) connected to one or more network(s) 112;
- a user interface module 320 that receives commands and/or inputs from a user via the user interface 304 (e.g., from the input devices 308) and provides outputs for playback and/or display on the user interface 304 (e.g., the output devices 306);
- a media application 322 (e.g., an application associated with and for accessing a media-providing service of a media content provider such as media content server 104, including a media player, a streaming media application, or any other appropriate application or component of an application) for browsing, receiving, processing, presenting, and requesting playback of media (e.g., media items, such as tracks). The media application 322 may also be used to monitor, store, and/or transmit (e.g., to media content server 104) data associated with user behavior. The media application 322 includes the following modules (or sets of instructions), or a subset or superset thereof:
    - an authentication module 324 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
    - a media content browsing module 326 for providing controls and/or user interfaces enabling a user to navigate, select for playback, and otherwise control or interact with media content, whether the media content is stored or played locally or remotely;

a content items module 328 storing media items for playback; and a listening history 329 storing information about tracks consumed by the user and/or the user's playback behavior;

a web browser application 330 (e.g., Internet Explorer or Edge by Microsoft, Firefox by Mozilla, Safari by Apple, or Chrome by Google) for accessing, viewing, and interacting with web sites; and other applications 332, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

The memory 312 (e.g., the media application 322) may include instructions for performing the method 200 (FIGS. 2A-2C) or a portion thereof.

In some implementations, the media presentation system 108 is a type of client device 102, and includes some or all of the same components, modules, and sub-modules as described above in FIG. 3 with respect to the client device 102.

Figure 4:
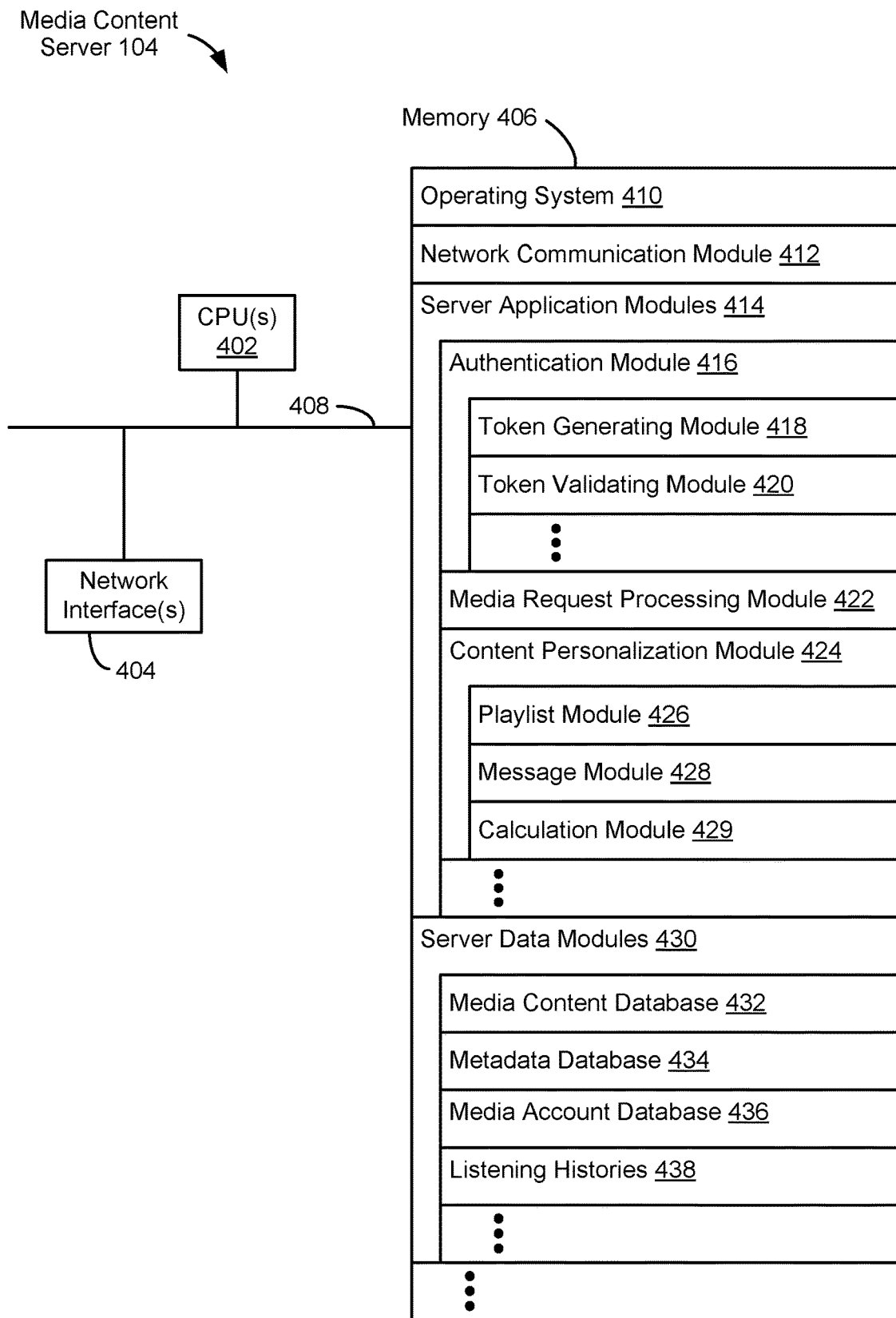
FIG. 4 is a block diagram illustrating a media content server in accordance with some implementations.

FIG. 4 is a block diagram illustrating a media content server 104 in accordance with some implementations. The media content server 104 typically includes one or more central processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 406, optionally, includes one or more storage devices remotely located from one or more CPUs 402. Memory 406, or, alternatively, the non-volatile memory device(s) within memory 406, includes a non-transitory computer-readable storage medium. In some implementations, memory 406, or the non-transitory computer-readable storage medium of memory 406, stores the following programs, modules and data structures, or a subset or superset thereof:

an operating system 410 that includes procedures for handling various basic system services and for performing hardware-dependent tasks;

a network communication module 412 that is used for connecting the media content server 104 to other computing devices via one or more network interfaces 404 (wired or wireless) connected to one or more networks 112;

one or more server application modules 414 for performing various functions with respect to providing and managing a content service, the server application modules 414 including, but not limited to, one or more of:

an authentication module 416 for managing authentication and/or authorization requests, the authentication module 416 including, but not limited to, one or more of:

a token generating module 418 for generating authentication tokens permitting use of media presentation systems 108; and a token validating module 420 for verifying that an authentication token is valid (e.g., has not yet expired or has not yet been revoked); and a media request processing module 422 for processing requests for media content and facilitating access to requested media items by client devices (e.g., the client device 102) including, optionally, streaming media content to such devices and/or to one or more media presentation systems 108;

a content personalization module 424 for assigning one or more traits (e.g., a first personality trait) to a user and providing personalized content (e.g., playlists, tracks, advertisements, tooltips, notifications, etc.) to users of the content service, including, but not limited to, one or more of:

a playlist module 426 for processing (e.g., selecting and/or generating) and storing data (e.g., playlists and/or tracks) for selecting content based on the one or more traits (e.g., the first personality trait);

a message module 428 for processing (e.g., selecting and/or generating) messages (e.g., advertisements, tooltips, notifications, and/or recommendations) to be provided to the user based on the one or more traits (e.g., the personality trait); and a calculation module 429 for determining a degree to which a user is associated with a trait.

one or more server data module(s) 430 for handling the storage of and access to media items and metadata relating to the media items; in some implementations, the one or more server data module(s) 430 include:

a media content database 432 for storing media items (e.g., audio files, video files, text files, etc.);

a metadata database 434 for storing metadata relating to the media items;

a media account database 436 for storing account information for user media accounts, including user profiles (e.g., demographic groups), credentials (e.g., user identifiers, passwords, email addresses, etc.), credentials or identifiers of any linked accounts, listening histories, and the like; and listening histories 438 storing information about tracks consumed by one or more users and/or the playback behavior of the one or more users (e.g., each user has a respective listening history of the listening histories).

The memory 406 (e.g., the content personalization module 424) may include instructions for performing the method 200 (FIGS. 2A-2C) or a portion thereof.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 312 and 406 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 312 and 406 optionally store a subset or superset of the respective modules and data structures identified above. Furthermore, memory 312 and 406 optionally store additional modules and data structures not described above.

Although FIG. 4 illustrates the media content server 104 in accordance with some implementations, FIG. 4 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at an electronic device associated with a media-providing service having one or more processors and memory storing instructions for execution by the one or more processors:
tracking behavior of a user over a predefined time period;
determining that at least a portion of the tracked behavior is associated with a first personality trait identified by the media-providing service;
based at least in part on the tracked behavior, assigning the first personality trait to the user; and
providing to the user, personalized content associated with the first personality trait assigned to the user.

2. The method of claim 1, further comprising:
identifying one or more characteristics of media items as relating to at least one respective personality trait of a plurality of personality traits; and
assigning one or more user behaviors to the respective personality trait.

3. The method of claim 2, wherein determining that at least a portion of the tracked behavior is associated with the first personality trait comprises determining that the tracked behavior of the user corresponds to a first user behavior of the one or more user behaviors.

4. The method of claim 1, wherein tracking behavior of the user comprises storing information about the tracked behavior in a listening history of the user.

5. The method of claim 1, further comprising, at the electronic device:
assigning the user a second personality trait based at least in part on a listening history of the user; and
providing personalized content to the user based on the second personality trait.

6. The method of claim 1, wherein tracking the user behavior includes tracking use of a shuffle feature by the user.

7. The method of claim 1, wherein tracking the user behavior includes tracking use of a skip feature by the user.

8. The method of claim 7, wherein:
tracking the use of the skip feature comprises counting a number of media items the user skips before completing playback; and
assigning the first personality trait to the user comprises labeling the user as neurotic in response to determining that the number of media items the user skips satisfies a threshold.

9. The method of claim 1, wherein providing the personalized content comprises changing a tone of voice for messages for presentation to the user based on the first personality trait.

10. The method of claim 1, wherein providing the personalized content comprises promoting, to the user, a content source associated with the first personality trait.

11. The method of claim 1, wherein providing the personalized content comprises selecting media items to recommend to the user from one or more content sources of the media-providing service.

12. The method of claim 11, wherein the one or more content sources of the media-providing service comprise one or more radio stations.

13. The method of claim 1, further comprising, at the electronic device, determining an interest level corresponding to a user preference for a first content type over a second content type, based at least in part on the assigned first personality trait;
wherein the personalized content is provided to the user based on the interest level.

14. The method of claim 13, wherein the interest level is an interest level in a message.

15. The method of claim 1, wherein assigning the first personality trait to the user is further based at least in part on one or more demographic variables for the user.

16. The method of claim 1, wherein the first personality trait is selected from the group consisting of: openness, agreeableness, extroversion, neuroticism, and conscientiousness.

17. The method of claim 1, wherein the first personality trait corresponds to the Meyers-Briggs personality model.

18. An electronic device of a media-providing service, comprising:
one or more processors; and
memory storing one or more programs for execution by the one or more processors, the one or more programs comprising instructions for:
tracking behavior of a user over a predefined time period;
determining that at least a portion of the tracked behavior is associated with a first personality trait identified by the media-providing service;
based at least in part on the tracked behavior, assigning the first personality trait to the user; and
providing, to the user, personalized content associated with the first personality trait assigned to the user.

19. A non-transitory computer-readable storage medium storing one or more programs configured for execution by an electronic device of a media-providing service, the one or more programs comprising instructions for:
tracking behavior of a user over a predefined time period;
determining that at least a portion of the tracked behavior is associated with a first personality trait identified by the media-providing service;

based at least in part on the tracked behavior, assigning the first personality trait to the user; and providing, to the user, personalized content associated with the first personality trait assigned to the user.

* * * * *